March 3, 1931.  J. P. WARNER  1,795,062
CONDUIT BOX
Filed May 24, 1928  2 Sheets-Sheet 1

Witness:

Jo Baily Brown

Inventor:
James P. Warner
by Brown & Critchlow
his attorneys

March 3, 1931.  J. P. WARNER  1,795,062
CONDUIT BOX
Filed May 24, 1928    2 Sheets-Sheet 2

Witness:
Jo. Baily Brown

Inventor:
James P. Warner.
by Brown & Critchlow
his Attorneys

Patented Mar. 3, 1931

1,795,062

UNITED STATES PATENT OFFICE

JAMES P. WARNER, OF PITTSBURGH, PENNSYLVANIA

CONDUIT BOX

Application filed May 24, 1928. Serial No. 280,224.

The invention relates to junction boxes or pull boxes of the type utilized for connecting conduits to conduit bases in which electrical wiring is extended in and around building walls and floors.

It is the usual practice in conformity with the majority of the systems and methods of wiring buildings in vogue today to extend the electric wiring through the walls and floors of the building in armored cables or conduits. Where the conduit type of baseboard is employed for extending the wires around the walls, the cables or conduits carrying the wires are connected to junction boxes placed in the wall structure of the building behind and attached to the conduit base. The wiring is thereby made readily accessible. Heretofore, in the different types of junction boxes used, there has frequently been difficulty when wires were to be pulled through the conduit or manipulated in the conduit base. There has also been trouble in allowing for the desired large radius of curvature in the conduit when it was bent upwardly from the floor structure and fitted into the box.

It is an object of the invention to provide a junction box that may be used in conjunction with a conduit base for the purpose of facilitating wiring or inserting wires into the conduit base both at the time of original installation and subsequently when conductors are to be added.

It is also an object of the invention to provide a junction box having the above noted characteristics that may be inserted in the wall structure and provided with an opening through which electric conductors may be manipulated and drawn through a conduit and distributed in the conduit base.

Another object of the invention is to provide a junction box to be used for connecting a conduit to a conduit base which permits a bend of comparatively large radius being made in the conduit between the floor structure and a point where it connects to the junction box.

Figure 1:
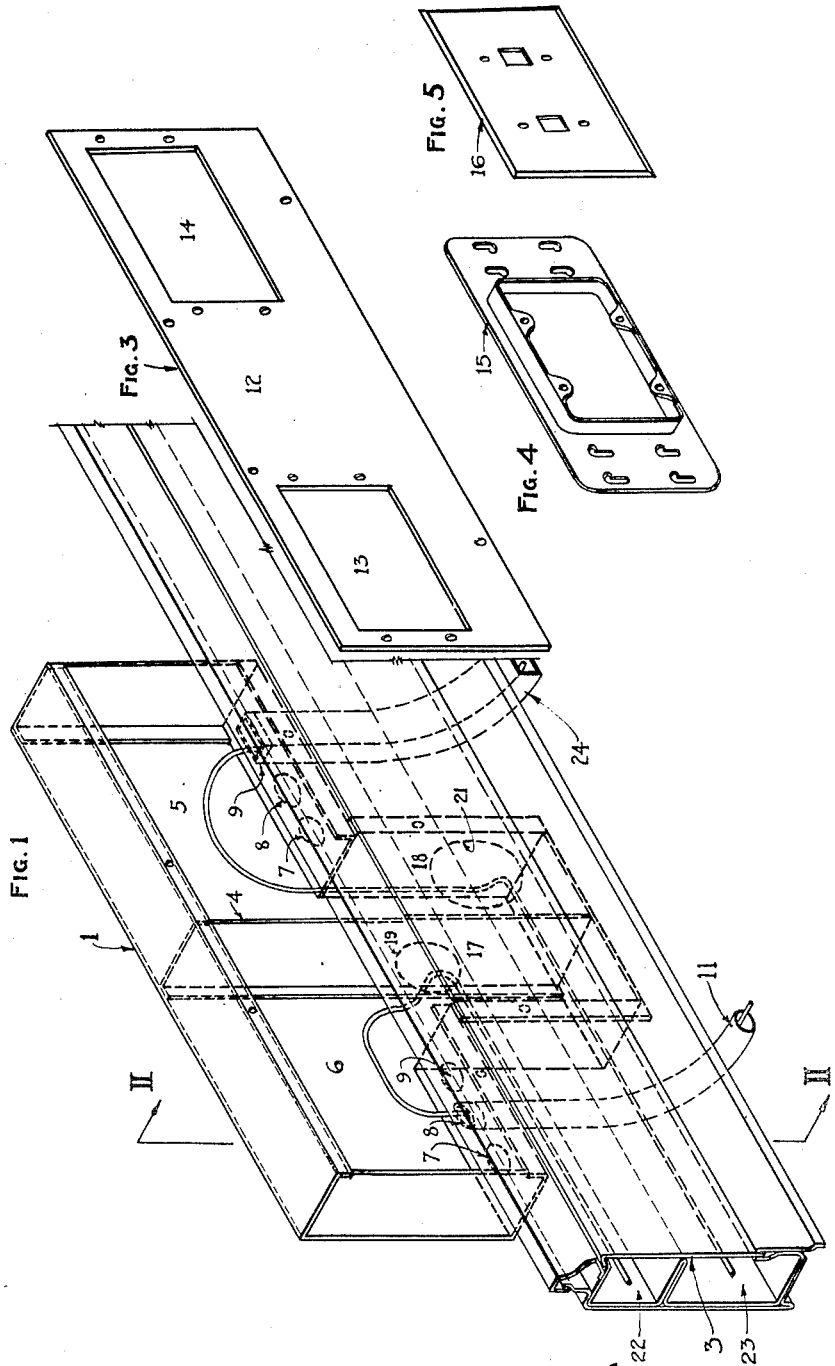
Figure 2:
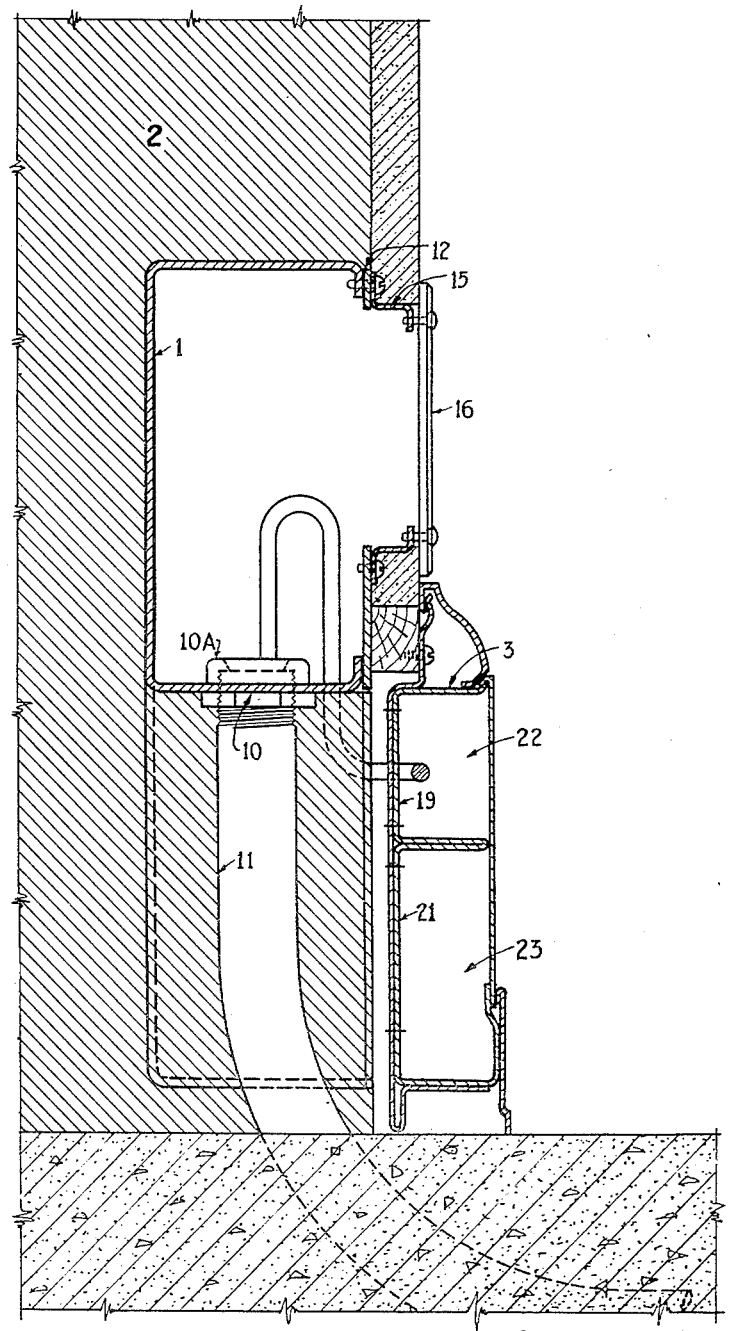

In the accompanying drawings which form a part of this specification Fig. 1 illustrates a perspective view of a preferred embodiment of the invention, the front plate of the junction box being removed to more clearly illustrate the various parts of the box; Fig. 2 is a view in cross section of the junction box shown in Fig. 1 taken along the line II—II; and Figs. 3, 4 and 5 views of the parts removed from the box illustrated in Fig. 1.

A junction box or pull box constructed in accordance with the invention may be made from any adaptable material and placed in the wall structure of a room behind the conduit base. The conduit base referred to is the well known hollow type of baseboard employed for carrying electric conductors around a room. It is usually equipped with a removable front plate making the wires contained in it conveniently accessible, and it also usually has a partition dividing it into two compartments for carrying conductors of different potentials.

An upper offset portion of the junction box or pull box is made sufficiently high above the bottom of the conduit base to permit the insertion therein of an armored cable or conduit having a sufficiently large radius of curvature to prevent pinching or obstruction of the passage in the conduit. This upper portion is also provided with an opening registering with an opening in the wall structure and has a detachable cover whereby the conductors or wires in the conduit and pull box are made readily accessible from the outside of the box. The box is further provided with a downwardly projecting portion adapted to fit against the back of the conduit base. This portion opens into the upper portion of the box and also registers with openings which may be cut in the back of the conduit base in the different raceways in the base, whereby the conductors or wires pulled into the upper portion of the box may be readily manipulated and inserted into said raceways.

Referring to the drawings, a junction box 1 is disposed in a wall structure 2 behind a conduit base 3. The box proper has a vertical partition 4 passing upwardly through its longitudinal center which divides it into two compartments 5 and 6, each compartment forming a separate junction box. Knock-out holes 7, 8, and 9 are provided in the lower wall of the upper offset portion of each compartment for receiving the end of a conduit or armored cable 11 which may be secured therein by a lock nut 10 and bushing 10a. From the spaced relation of the lower wall portion of the upper offset portion of the box and the bottom of conduit base 3 or the floor of the building, conduit 11 may be bent upwardly on a comparatively large radius when it is fitted into one of the openings 7, 8, or 9. Consequently a sharp bend need not be made in the conduit, and as certain building regulations and safety legislations require that a specified standard radius of curvature be used for each size of conduit, to safeguard the wires contained therein, this feature lends a particular advantage to this type of junction box.

A plate 12 provided with openings 13 and 14 is suitably fitted upon the front of the upper portion of the box, and a molding or frame 15 attached thereto, forming a frame around openings 13 and 14, which register with openings in the wall structure 2. The frame 15 is adapted to project outwardly far enough to support a detachable cover 16 in flush relation with the wall surface. The lower downwardly projecting portion of the box comprising chambers 17 and 18 open into the upper portions of the box and face the back of the conduit base 3 against which they are disposed. Hence if holes or openings 19 and 21 are provided in the raceways 22 and 23, respectively, and plate 16 removed, wires may be readily pulled through conduit 11 or rectangular duct 24 into the upper distribution portion of the box and conveniently manipulated and inserted into the respective raceways.

By having a distribution box portion or pull box of this character above the conduit base into which a conduit carrying wires may be fitted, convenient and accessible means is provided for pulling the wires through the conduit and manipulating them into the conduit base. While the structure is not limited to a special shape, it may conveniently take the form of an inverted L comprising one-half of the box illustrated in the drawing. In practice however, it is found to be more convenient to form it in the T-shaped manner as shown, when systems of different voltage are used.

From the shape of the box wires may not only be extended from a conduit such as conduit 11 into the junction box and from there into the conduit base, but also wires in the conduit base may be passed into the junction box and from there passed into a floor conduit such as the rectangular shaped conduit 24 which is adapted to carry wiring through the floor, for desk outlets and the like.

According to the provisions of the patent statutes, I have explained the principle and mode of operation of my invention and have illustrated what I now consider to be its preferred embodiment. However, I desire to have it understood that, within the scope of the appended claims the invention may be practiced otherwise than as specifically described.

I claim:

1. The combination with a conduit base of a junction box adapted to fit within the wall structure behind the conduit base and having a portion disposed thereabove, the said portion of the junction box disposed behind the conduit base being provided with an opening registering with an opening in the conduit base and the portion of the junction box disposed above the conduit base being provided with an opening registering with an opening in the wall structure, and a conduit extending through the wall structure behind the conduit base and opening into the portion of the junction box disposed above the conduit base.

2. The combination with a conduit base for a wall structure of a junction box having an offset portion and disposed in the wall structure behind the conduit base, the said junction box having openings registering with openings in the wall structure and the conduit base respectively, and a conduit extending through the wall structure outside of the portion of the junction box that is disposed behind the conduit base and opening into the offset portion of the conduit base.

3. The combination with a conduit base for a wall structure of a junction box having an offset portion and disposed in the wall structure behind the conduit base, the said junction box having openings registering with openings in the wall structure and the conduit base respectively, and knock-out openings in the wall of the offset portion for receiving the conduit.

4. The combination with a conduit base for a wall structure of a junction box disposed in the wall structure above the conduit base and having an opening registering with an opening in the wall structure above the conduit base for making electrical conductors accessible, the junction box being provided with knock-out openings for receiving a conduit containing electrical conductors and having an extension behind the conduit base provided with an opening registering with an opening in the rear of the conduit base through which conductors may be extended from the junction box into the conduit base.

5. The combination with a conduit base for a wall structure disposed adjacent to the floor of a building, of a junction box fitted within the wall structure and having the lower wall thereof provided with knock-out holes for receiving a conduit and disposed behind the conduit base in spaced relation to the floor, the conduit beneath the floor being provided with a bend extending below the conduit base and extending into a knock-out opening, the said junction box being provided with an opening registering with an opening in the wall structure above the conduit base through which electrical conductors leading from the conduit into the junction box are accessible, and an extension in the junction box extending behind the conduit base and opening thereinto.

6. The combination with a conduit base for a wall structure disposed adjacent to the floor of a building, of a junction box arranged in the wall structure behind and adjacent to said base, said junction box comprising a distribution chamber having an opening registering with an opening in the wall structure above the baseboard and provided with a detachable cover therefor, and having a downwardly projecting portion opening out of the distribution chamber and registering with the back of the conduit base.

7. The combination with a conduit base for a wall structure disposed adjacent to the floor of a building, of a junction box arranged in the wall structure behind and adjacent to said base, said junction box being provided with a distribution chamber into which a conduit containing wires may be fitted and having an opening therein registering with an opening in the wall structure above the base, whereby wires extended into the distribution chamber may be accessible for pulling and manipulation, a detachable cover for said last mentioned opening, and a downwardly projecting portion opening into said chamber and registering with the back of said base whereby wires in said distribution chamber may be readily inserted in the base.

8. The combination with a conduit base for a wall structure disposed adjacent to the floor of a building of a T-shaped junction box arranged in the wall structure behind and adjacent to said base, said box having a partition extending vertically through the center thereof dividing it into two inverted L-shaped compartments, the lower wall of each of the upper laterally extending sections of this compartment being adapted to receive conduits, and the back wall of the lower downwardly projecting sections to register with the back of the conduit base, an opening being provided in each of said upper compartments registering with an opening in the wall structure above the base through which wires extending through conduits into the upper compartment may be readily pulled and manipulated into the conduit base, and detachable covers for said latter openings.

In testimony whereof, I sign my name.

JAMES P. WARNER.